(12) United States Patent
Lee et al.

(10) Patent No.: US 12,476,045 B2
(45) Date of Patent: Nov. 18, 2025

(54) MULTILAYER ELECTRONIC COMPONENT

(71) Applicant: SAMSUNG ELECTRO-MECHANICS CO., LTD., Suwon-si (KR)

(72) Inventors: Eun Jung Lee, Suwon-si (KR); Hyun Sik Chae, Suwon-si (KR); Sun Mi Kim, Suwon-si (KR); Dong Jun Jung, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 235 days.

(21) Appl. No.: 18/213,002

(22) Filed: Jun. 22, 2023

(65) Prior Publication Data
US 2024/0222010 A1 Jul. 4, 2024

(30) Foreign Application Priority Data
Dec. 29, 2022 (KR) .......................... 10-2022-0188725

(51) Int. Cl.
*H01G 4/30* (2006.01)
*H01G 4/002* (2006.01)
*H01G 4/232* (2006.01)

(52) U.S. Cl.
CPC .............. *H01G 4/002* (2013.01); *H01G 4/30* (2013.01); *H01G 4/2325* (2013.01)

(58) Field of Classification Search
None
See application file for complete search history.

(56) References Cited

U.S. PATENT DOCUMENTS

| | | |
|---|---|---|
| 2017/0018363 A1 | 1/2017 | Tanaka et al. |
| 2020/0105468 A1* | 4/2020 | Hashimoto ............ H01G 4/005 |
| 2020/0126724 A1* | 4/2020 | Takagi ..................... H01G 4/30 |
| 2021/0074479 A1 | 3/2021 | Lee |
| 2022/0319775 A1* | 10/2022 | Kato ...................... H01G 4/008 |

FOREIGN PATENT DOCUMENTS

| | | |
|---|---|---|
| JP | 2017-28013 A | 2/2017 |
| KR | 10-2021-0030755 A | 3/2021 |
| KR | 10-2022-0136140 A | 10/2022 |

\* cited by examiner

*Primary Examiner* — Timothy J. Dole
*Assistant Examiner* — Esther N Lian
(74) *Attorney, Agent, or Firm* — Morgan Lewis & Bockius LLP

(57) ABSTRACT

A multilayer electronic component includes a body including a dielectric layer and internal electrodes disposed in a first direction with the dielectric layer interposed therebetween, and having first and second surfaces opposing each other in the first direction, third and fourth surfaces opposing each other in a second direction, and fifth and sixth surfaces opposing each other in a third direction; side margin portions disposed on the fifth and sixth surfaces; and external electrodes disposed on the third and fourth surfaces. Each of the side margin portions includes a first region adjacent to the internal electrodes, and a second region adjacent to an outside of each of the side margin portions. An average Sn amount of the first region is lower than an average Sn amount of the second region. An Sn amount of the first region gradually increases from a side of the internal electrodes to the second region.

20 Claims, 10 Drawing Sheets

MULTILAYER ELECTRONIC COMPONENT

CROSS-REFERENCE TO RELATED APPLICATION (S)

This application claims benefit of priority to Korean Patent Application No. 10-2022-0188725 filed on Dec. 29, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various types of electronic products, such as an image display device, including a liquid crystal display (LCD), a plasma display panel (PDP), or the like, a computer, a smartphone, or a mobile phone, serving to charge or discharge electricity therein or therefrom.

The multilayer ceramic capacitor has a small size, implements high capacitance, and is easily mounted, and may thus be used as a component of various electronic devices. There has been increasing demand for a multilayer ceramic capacitor to have a reduced size and higher capacitance as each of various electronic devices such as a computer, a mobile device, and the like have a reduced size and higher output.

In addition, as industry interest in electric and electronic components for automobiles has recently increased, multilayer ceramic capacitors may be also required to have high reliability and high strength characteristics in order to be used in automobiles or infotainment systems.

Maximization of an effective area of an electrode (an increase in in effective volume fraction required for capacitance) is required for miniaturization and high capacitance of multilayer ceramic capacitors.

In order to realize a small-sized and high-capacity multilayer ceramic capacitor as described above, in manufacturing the multilayer ceramic capacitor, an internal electrode may be exposed in a width direction of a body, to maximize an area of the internal electrode in a width direction through a design without margin. In a stage after fabrication of such a chip and before sintering the same, a method of completing the multilayer ceramic capacitor by separately attaching a side margin portion to an exposed surface of the electrode in a width direction of the chip may be applied.

Capacitance per unit volume of the capacitor may be improved by separately attaching the side margin portion, but there may be a problem in that reliability may be lowered due to a decrease in thickness of the side margin portion Specifically, as a thickness of the side margin portion decreases, cracks caused by external impact may be easily generated and cracks generated outside the side margin portion may easily propagate into the body, to reduce reliability.

Therefore, development of a multilayer electronic component having a structure capable of suppressing occurrence of cracks and propagation of cracks in the side margin portion is required.

SUMMARY

An aspect of the present disclosure is to improve reliability of a multilayer electronic component.

An aspect of the present disclosure is to suppress the occurrence of cracks and the propagation of cracks in a side margin portion.

Objects of the present disclosure are not limited to the above, and will be more easily understood in the process of describing specific embodiments of the present disclosure.

According to an aspect of the present disclosure, a multilayer electronic component includes a body including a dielectric layer and first and second internal electrodes alternately disposed in a first direction with the dielectric layer interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; side margin portions disposed on the fifth and sixth surfaces; and external electrodes disposed on the third and fourth surfaces. Each of the side margin portions includes a first region adjacent to the first and second internal electrodes, and a second region adjacent to an outside of each of the side margin portions. An average Sn amount of the first region is lower than an average Sn amount of the second region. An Sn amount of the first region gradually increases from a side of the first and second internal electrodes to the second region.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
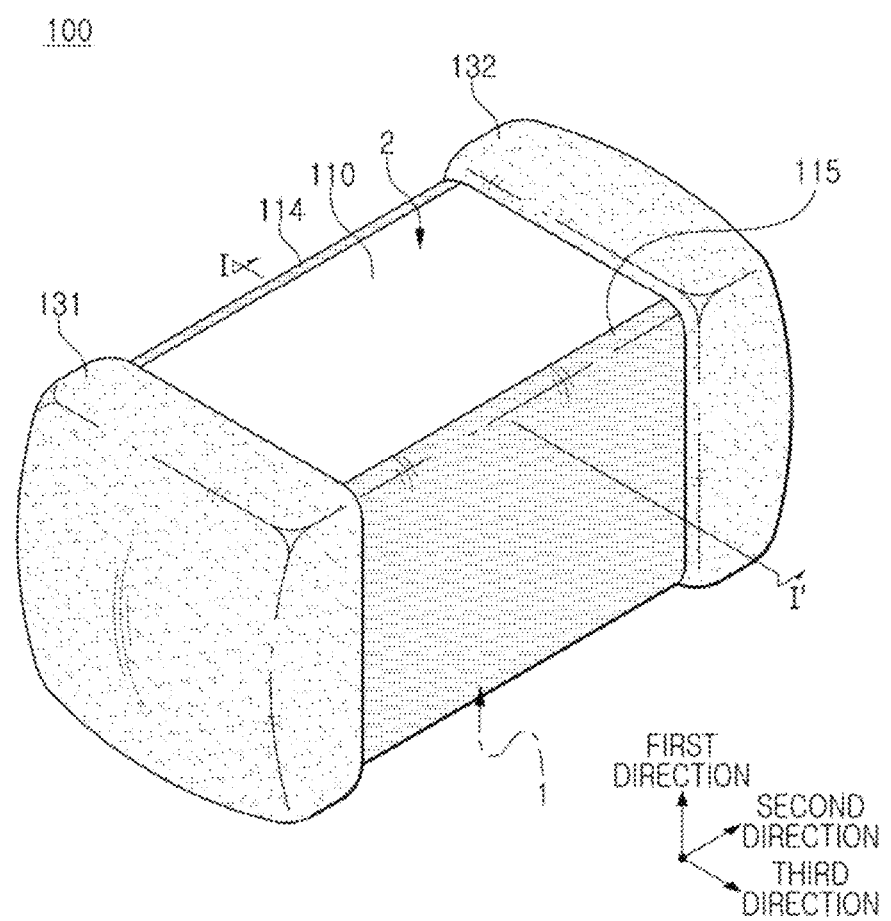
FIG. 1 is a schematic perspective view of a multilayer electronic component according to an embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a schematic perspective view of a multilayer electronic component according to an embodiment of the present disclosure.

Figure 2:
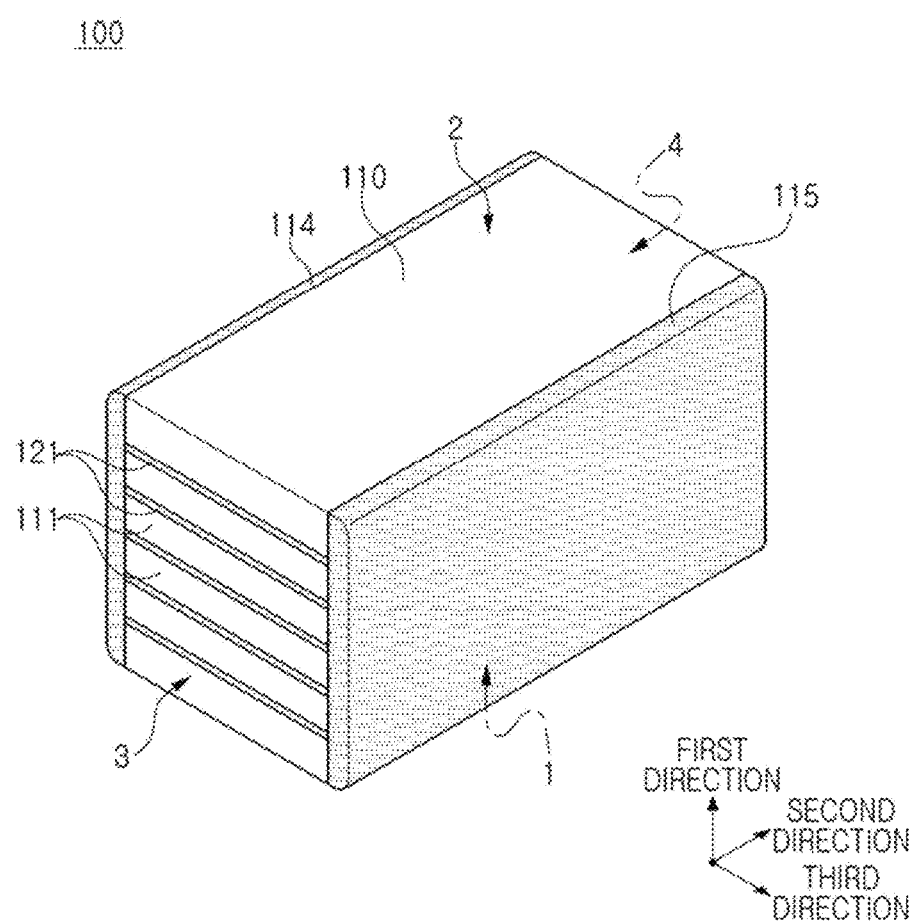
FIG. 2 is a perspective view of the multilayer electronic component of FIG. 1 excluding an external electrode.

FIG. 2 is a perspective view of the multilayer electronic component of FIG. 1 excluding an external electrode.

Figure 3:
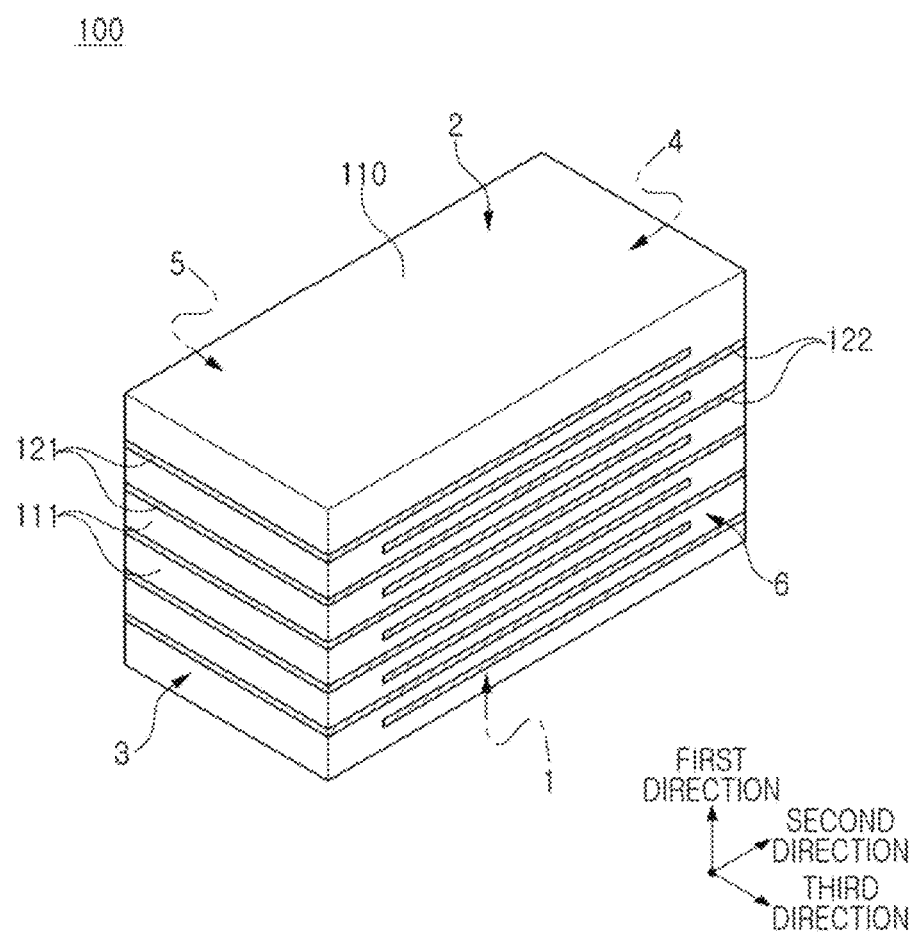
FIG. 3 is a perspective view of the multilayer electronic component of FIG. 1 excluding an external electrode and a side margin portion.

FIG. 3 is a perspective view of the multilayer electronic component of FIG. 1 excluding an external electrode and a side margin portion.

Figure 4:
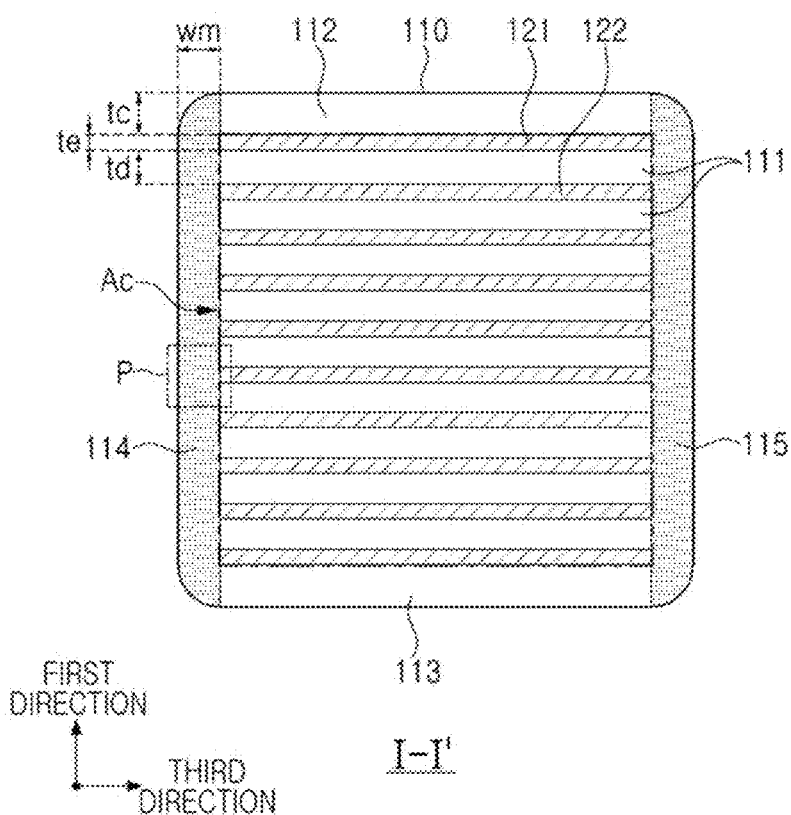
FIG. 4 is a cross-sectional view of FIG. 1, taken along line I-I'.

FIG. 4 is a cross-sectional view of FIG. 1, taken along line I-I'.

Figure 5:
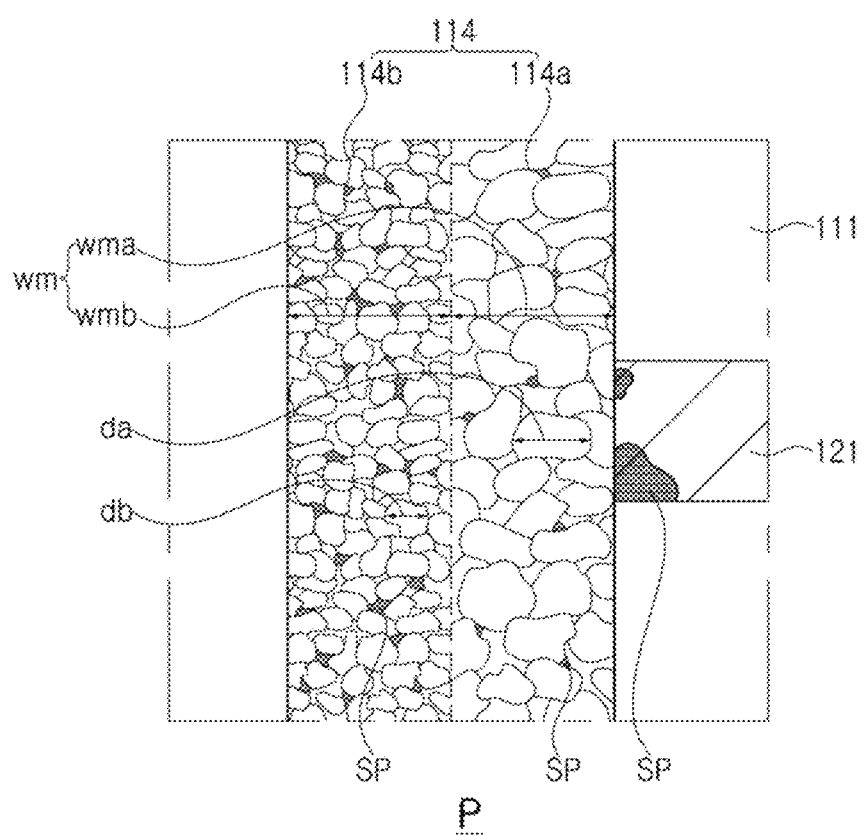
FIG. 5 is an enlarged view of portion P of FIG. 4.

FIG. 5 is an enlarged view of portion P of FIG. 4.

Hereinafter, a multilayer electronic component according to an embodiment of the present disclosure will be described in detail with reference to FIGS. 1 to 5.

A multilayer electronic component 100 according to an embodiment of the present disclosure may include a body 110 including a dielectric layer 111 and first and second internal electrodes 121 and 122 alternately disposed in a first direction with the dielectric layer 111 interposed therebetween, and having first and second surfaces 1 and 2 opposing each other in the first direction, third and fourth surfaces 3 and 4 connected to the first and second surfaces and opposing each other in a second direction, and fifth and sixth surfaces 5 and 6 connected to the first to fourth surfaces 1 to 4 and opposing each other in a third direction; side margin portions 114 and 115 disposed on the fifth and sixth surfaces 5 and 6; and external electrodes 131 and 132 disposed on the third and fourth surfaces 3 and 4. Each of the side margin portions 114 and 115 may include a first region 114a adjacent to each of the internal electrodes, and a second region 114b adjacent to an outside of each of the side margin portions. An average Sn amount of the first region 114a may be lower than an average Sn amount of the second region 114b, and an Sn amount of the first region 114a may gradually increase from each of the internal electrodes 121 and 122 to the second region 114b.

In the body 110, the dielectric layer 111 and the internal electrodes 121 and 122 may be alternately stacked.

Although the specific shape of the body 110 is not particularly limited, as illustrated, the body 110 may have a hexahedral shape or a shape similar thereto. Due to shrinkage of ceramic powder particles included in the body 110 during a sintering process, the body 110 may not have a perfectly straight hexahedral shape, and may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and a boundary between adjacent dielectric layers 111 may be integrated to such an extent that it is difficult to identify the same without using a scanning electron microscope (SEM).

According to an embodiment of the present disclosure, a raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, or the like.

As the material for forming the dielectric layer 111, various ceramic additives, organic solvents, binders, dispersants, or the like may be added to powders such as barium titanate ($BaTiO_3$) or the like according to the purpose of the present disclosure.

A thickness of the dielectric layer 111 does not need to be particularly limited.

To more easily small size and high capacitance of a multilayer electronic component, when a dielectric layer is generally formed thinly to have a thickness of less than 0.6 µm, in particular, when the thickness of the dielectric layer is 0.35 µm or less, reliability may be deteriorated.

According to an embodiment of the present disclosure, since occurrence of cracks and propagation of cracks in the side margin portions 114 and 115 may be suppressed by controlling the Sn amount for each position of each of the side margin portions 114 and 115, excellent reliability may be secured even when an average thickness td of at least one of a plurality of dielectric layers 111 is 0.35 µm or less.

Therefore, when the average thickness td of at least one of the plurality of dielectric layers 111 is 0.35 µm or less, a reliability improvement effect according to the present disclosure may be more remarkable.

The average thickness td of the dielectric layer 111 may mean an average size of the dielectric layer 111 disposed between the first and second internal electrodes 121 and 122 in the first direction.

The average thickness of the dielectric layer 111 may be measured by scanning an image of a cross-section of the body 110 in length and thickness directions (an L-T plane) with a scanning electron microscope (SEM) at a magnification of 10,000. More specifically, an average value thereof may be determined by measuring a thickness of one (1) dielectric layer at thirty (30) equally spaced points in the length direction in the scanned image. The thirty (30) equally spaced points may be designated in the capacitance formation portion Ac. In addition, when such an average value is determined by extensively using measurements of average values to ten (10) dielectric layers, the average thickness of the dielectric layer may be more generalized.

The body 110 may include a capacitance formation portion Ac disposed in the body 110 and including the first internal electrode 121 and the second internal electrode 122, disposed to oppose each other, with the dielectric layer 111 interposed therebetween to form capacitance, and upper and lower cover portions 112 and 113 formed on both end surfaces of the capacitance formation portion Ac in the first direction.

In addition, the capacitance formation portion Ac may be a portion contributing to capacitance formation of the multilayer electronic component, and may be formed by repeatedly stacking the plurality of first and second internal electrodes 121 and 122 with the dielectric layer 111 interposed therebetween.

The upper cover portion 112 and the lower cover portion 113 may be formed by stacking a single dielectric layer or two or more dielectric layers on upper and lower surfaces of the capacitance formation portion Ac, respectively, in the thickness direction, and may basically play a role in preventing damage to the internal electrodes due to physical or chemical stress.

The upper cover portion 112 and the lower cover portion 113 may not include internal electrodes, and may include the same material as the dielectric layer 111. For example, the upper cover portion 112 and the lower cover portion 113 may include a ceramic material, and may include, for example, a barium titanate ($BaTiO_3$)-based ceramic material.

A thickness of each of the cover portions 112 and 113 does not need to be particularly limited. To more easily achieve miniaturization and high capacitance of the multilayer electronic component, a thickness tc of each of the cover portions 112 and 113 may be 20 µm or less.

In this case, the thickness tc of each of the cover portions 112 and 113 may mean a size of each of the cover portions 112 and 113 in the first direction. In addition, the thickness tc of each of the cover portions 112 and 113 may mean an average thickness tc of each of the cover portions 112 and 113, and may mean an average size of each of the cover portions 112 and 113 in the first direction.

The average size of each of the cover portions 112 and 113 in the first direction may be measured by scanning images of a plane of the body 110 in the first and second directions with a scanning electron microscope (SEM) at a magnification of 10,000. More specifically, a value of the average thickness may be determined by measuring size of one (1) cover portion in the first direction at thirty (30) points equally spaced in the second direction in the scanned image. The thirty (30) equally spaced points may be designated on the upper cover portion 112. In addition, when such an average value is determined by extensively using measurements of average values to the lower cover portion 113, the average size of each of the cover portions 112 and 113 in the first direction may be more generalized.

The internal electrodes 121 and 122 may be alternately disposed with the dielectric layer 111.

The internal electrodes 121 and 122 may include first and second internal electrodes 121 and 122. The first and second internal electrodes 121 and 122 may be alternately disposed to oppose each other with the dielectric layer 111, constituting the body 110, interposed therebetween, and may be exposed from the third and fourth surfaces 3 and 4 of the body 110, respectively.

Referring to FIG. 3, the first internal electrode 121 may be spaced apart from the fourth surface 4, and may be exposed from (or be in contact with or extend from) the third surface 3, and the second internal electrode 122 may be spaced apart from the third surface 3, and may be exposed from (or be in contact with or extend from) the fourth surface 4. In addition, the first internal electrode 121 may be exposed through the third, fifth, and sixth surfaces 3, 5, and 6, and the second internal electrode 122 may be exposed through the fourth, fifth, and sixth surfaces 4, 5, and 6.

In this case, the first and second internal electrodes 121 and 122 may be electrically separated from each other by the dielectric layer 111 interposed therebetween.

The internal electrodes 121 and 122 may include at least one of nickel (Ni), copper (Cu), palladium (Pd), silver (Ag), gold (Au), platinum (Pt), tin (Sn), tungsten (W), titanium (Ti), or an alloy thereof.

Thicknesses of the internal electrodes 121 and 122 do not need to be particularly limited.

In general, when a thickness of each of the internal electrodes is less than 0.6 µm, and particularly when a thickness of each of the internal electrodes is 0.35 µm or less, reliability may be deteriorated.

According to an embodiment of the present disclosure, since occurrence of cracks and propagation of cracks in the side margin portions 114 and 115 are suppressed by controlling an Sn amount for each position of the side margin portions 114 and 115, excellent reliability may be secured even when an average thickness te of at least one of a plurality of internal electrodes 121 and 122 is 0.35 µm or less.

Therefore, when the average thickness te of at least one of the plurality of internal electrodes 121 and 122 is 0.35 µm or less, effects according to the present disclosure may be more remarkable, and miniaturization and high capacitance of the multilayer electronic component may be more easily achieved.

The average thickness te of each of the internal electrodes 121 and 122 may mean an average size of each of the internal electrodes 121 and 122 in the first direction.

The average thickness of each of the internal electrodes 121 and 122 may be measured by scanning an image of a cross-section of the body 110 in the length and thickness directions (an L-T plane) with a scanning electron microscope (SEM) at a magnification of 10,000. More specifically, an average value thereof may be determined by measuring a thickness of one (1) internal electrode at thirty (30) equally spaced points in the length direction in the scanned image. The thirty (30) equally spaced points may be designated in the capacitance formation portion Ac. In addition, when such an average value is determined by extensively using measurements of average values to ten (10) internal electrodes, the average thickness of the internal electrode may be more generalized.

The side margin portions 114 and 115 may be disposed on the fifth and sixth surfaces 5 and 6 of the body 110, respectively.

The side margin portions 114 and 115 may include a first side margin portion 114 disposed on the fifth surface 5 of the body 110 and a second side margin portion 115 disposed on the sixth surface 6 of the body 110. For example, the margin portions 114 and 115 may be disposed on both end surfaces of the body 110 in the third direction. The side margin portions 114 and 115 may be disposed on end surfaces of the capacitance formation portion Ac in the third direction, and may be connected to the first and second internal electrodes 121 and 122, respectively.

The side margin portions 114 and 115 may basically serve to prevent damage to the internal electrodes due to physical or chemical stress, respectively.

The side margin portions 114 and 115 may be cut to expose the fifth and sixth surfaces 5 and 6 of the body after stacking, to suppress a step difference caused by the internal electrodes 121 and 122, and may be then formed by stacking a single dielectric layer or two or more dielectric layers in the third direction on both end surfaces of the capacitance formation portion Ac in the third direction.

As a method of realizing a multilayer ceramic capacitor having a small size and high capacitance, in manufacturing the multilayer ceramic capacitor, the internal electrodes may be exposed in the width direction of the body, to maximize an area in the width direction of each of the internal electrodes according to a design without margin. A method of completing a process by separately attaching the side margin portions to the exposed surface of the electrode in the width direction of the chip, in a process after preparing a chip but before sintering. Capacitance per unit volume of the capacitor may be improved by separately attaching the side margin portions, but there may be a problem in that reliability is lowered due to a decrease in thickness of the side margin portions. Specifically, as the thickness of each of the side margin portions decreases, cracks caused by external impact may be easily generated, and cracks generated outside the side margin portions may easily propagate to the body, to deteriorate reliability.

Side margin portions 114 and 115 according to an embodiment of the present disclosure may include a first region 114a adjacent to each of the internal electrodes 121 and 122, and a second region 114b adjacent to an outside of each of the side margin portions, respectively. An Sn amount of the first region 114a may be smaller than an Sn amount of the second region 114b and, and the Sn amount of the first region 114a may gradually increase from each of the internal electrodes 121 and 122 to the second region 114b. Therefore, not only may cracks be suppressed from occurring in the second region 114b, but also the first region 114a may suppress propagation of the cracks generated in the second region 114b may be transmitted to the body 110, to improve reliability.

An Sn amount of the second region 114b, which may be directly affected by impact, stresses, or the like from an external source of the multilayer electronic component 100, may be increased to prevent occurrence of cracks, and an Sn amount of the first region 114a, which may not be directly affected by impact, stresses, or the like from the external source, may be decreased to suppress propagation of cracks. In addition, as the Sn amount of the first region 114a has a concentration gradient gradually increasing from each of the internal electrodes 121 and 122 toward the second region 114b, to prevent delamination due to a difference in composition with the body 110 and a difference in composition with the second region 114b, and to effectively suppress propagation of cracks to the body 110 even when cracks occur in the second region 114b.

Hereinafter, the first side margin portion 114 will be described with reference to FIG. 4, which may be an enlarged view of the cross-section of the first side margin portion 114 as shown in FIG. 5. Since the second side margin portion 115 has a symmetrical relationship with the first side margin portion 114 in the third direction, the description of the first side margin portion 114 may be applied to the second side margin portion 115 in consideration of its symmetry in the third direction.

In an embodiment, a multilayer electronic component may satisfy 3≤Cs2/Cs1≤5, where Cs1 is an average Sn amount of the first region 114a, and Cs2 is an average Sn amount of the second region 114b. Therefore, a crack generation suppressing effect and a crack propagation suppressing effect may be further improved.

When Cs2/Cs1 is less than 3, there may be concern that a crack generation suppressing effect and a crack propagation suppressing effect may be insufficient, and when Cs2/Cs1 exceeds 5, there may be concern that delamination may occur.

An amount of each of Cs1 and Cs2 do not need to be particularly limited. as a preferred example, if the average Sn amount of the first region 114a is Cs1 and the average Sn amount of the second region 114b is Cs2, the Cs1 may be 0.25 at % or more and 0.7 at % or less, and the Cs2 may be 0.7 at % or more and 4.0 at % or less, but the present disclosure is not limited thereto.

In an embodiment, an average size wma of the first region 114a in the third direction may be greater than or equal to 4 µm and less than or equal to 10 µm. Therefore, a crack propagation suppressing effect may be further improved, and capacitance per unit volume of the multilayer electronic component 100 may be improved.

When an average size wma of the first region 114a in the third direction is less than 4 µm, it may be difficult to further improve a crack propagation suppressing effect, and there may be a concern that, when the average size (wma) exceeds 10 µm, capacitance per unit volume increases.

In an embodiment, the Sn amount of the first region 114a may increase by 0.1 at % or more per 1 µm, in a direction from each of the internal electrodes 121 and 122 to the second region 114b. Therefore, a crack propagation suppressing effect may be further improved.

When an increase in Sn amount of the first region 114a is less than 0.1 at % per 1 µm, it may be difficult to further improve a crack propagation suppressing effect.

In an embodiment, a difference between an Sn amount of a portion of the first region 114a contacting the body 110 and an Sn amount of a portion of the first region 114a contacting the second region 114b may be 0.5 at % or more. Therefore, a crack propagation suppressing effect may be further improved.

In an embodiment, an average size wmb of the second region 114b in the third direction may be greater than or equal to 6 µm and less than or equal to 15 µm. Therefore, a crack propagation suppressing effect may be further improved, and capacitance per unit volume of the multilayer electronic component 100 may be improved.

When an average size wmb of the second region 114b in the third direction may be less than 6 µm, it may be difficult to further improve an crack propagation suppressing effect, and there may be a concern that, when the average size wmb exceeds 15 µm, capacitance per unit volume increases.

Widths of the side margin portions 114 and 115 do not need to be particularly limited. In this case, a width of each of the side margin portions 114 and 115 may mean a size of each of the side margin portions 114 and 115 in the third direction. To more easily achieve miniaturization and high capacitance of the multilayer electronic component, an average size wm of the first side margin portion 114 in the third direction may be 20 µm or less.

The above-described wm, wma, and wmb may be measured by scanning an image of a cross-section of the body 110 in the first and third directions cut from a center of the body 110 in the second direction with a scanning electron microscope (SEM) at a magnification of 10,000. More specifically, an average value thereof may be determined by measuring a size at thirty ten (10) equally spaced points in the first direction in the image.

In an embodiment, an Sn amount of the second region 114b may increase by less than 0.1 at % per 1 µm, in a direction from the first region 114a to the outside of each of the side margin portions 114 and 115. Therefore, a crack propagation suppressing effect may be further improved. For example, an Sn amount of the second region 114b may be substantially constant for each position, and may not substantially have a concentration gradient of the Sn amount, unlike the first region 114a.

In an embodiment, a difference between an Sn amount of a portion of the second region 114b contacting the first region 114a and an Sn amount of a portion of the second region 114b contacting the outside of the side margin portions 114 and 115 may be 0.3 at % or less. Therefore, a crack propagation suppressing effect may be further improved. For example, an Sn amount of the second region 114b may be substantially constant for each position, and may not substantially have a concentration gradient of the Sn amount, unlike the first region 114a.

In an embodiment, an average crystal grain size da of the first region 114a may be larger than an average crystal grain size db of the second region 114b and 115b) by 50 nm or more. Therefore, the second region 114b may more effectively suppress occurrence of cracks, and the first region 114a may more effectively suppress propagation of cracks. Sn included in the side margin portions may serve to suppress growth of crystal grains, and a difference between the average crystal grain size da of the first region 114a and the average crystal grain size db of the second region 114b may be due to a difference in Sn amount included in each region.

The average crystal grain size da of the first region and the average crystal grain size db of the second region do not need to be particularly limited. As a preferred example, the average crystal grain size da of the first region may be 200 nm or more and 400 nm or less, and the average crystal grain size db of the second region may be 150 nm or more and 300 nm or less, but the present disclosure is not limited thereto.

In analysis of element amounts included in the above-described first and second regions, may have been analyzed from an image obtained by scanning cross-sections in the first and third directions taken in the center of the body 110 in the second direction with a scanning transmission electron microscope (STEM). Specifically, referring to FIGS. 6 and 7, an arbitrary line L1 may be set from an internal electrode adjacent to the first region to a portion of the second region in the image, and a line profile may be performed along the L1 to analyze element amounts included in the first and second regions. In addition, after setting five (5) lines having equal intervals in the first direction, an average value of values obtained from each line profile for the five (5) lines may be obtained for further generalization.

In addition, the average sizes da and db of the crystal grains included in the first and second regions may be obtained by scanning an image of a cross-section in the first and third directions cut at the center of the body 110 in the second direction with a scanning transmission electron microscope (STEM) at a magnification of 50,000. In addition, the image may be a scan of a central region of each of the side margin portions in the first direction, a size of each of the crystal grains may be an average value of major and minor diameters of the crystal grains, and an average size of the crystal grains may be an average value of sizes of at least one hundred (100) or more crystal grains.

A method for adjusting the Sn amount of the first region 114a and the Sn amount of the second region 114b does not need to be particularly limited. As a preferred example, a sheet for the side margin portions containing Sn may be attached to both end surfaces of the body in the third direction in the third direction, and spread of the Sn included in the sheet for the side margin portions may be then induced, as sintering conditions are controlled, to adjust the Sn amount of the first region 114a and the Sn amount of the second region 114b. In addition, the Sn amount of the first region 114a and the Sn amount of the second region 114b may be adjusted by controlling an amount of Sn included in a sheet for a side margin portion for forming the first region 114a to be smaller than an amount of Sn included in a sheet for a side margin portion for forming the second region 114b.

In an embodiment, the first region 114a and the second region 114b may include Si, and the average Si amount of the first region 114a may be lower than the average Si amount of the second region. Therefore, strength of the side margin portions 114 and 115 may be improved, and a crack generation suppressing effect and a crack propagation suppressing effect may be further improved. In addition, according to an embodiment of the present disclosure, Sn and Si may be simultaneously included in the side margin portions 114 and 115, and as Sn, which has a low melting point and is easy to diffuse, diffuses, Si may also diffuse along with Sn. The average Si amount of the first region 114a may be easily controlled to be lower than the average Si amount of the second region 114b. In addition, an Si amount in a portion of the second region 114b adjacent to an outer surface of the side margin portion may be larger than an Si amount in a portion of the second region 114b adjacent to the first region 114a.

In this case, Si may be precipitated as a Si secondary phase SP after sintering, and the first and second regions may thus include the Si secondary phase SP. Therefore, an area ratio of the Si secondary phase SP disposed in the first region may be lower than an area ratio of the Si secondary phase SP disposed in the second region.

In an embodiment, the first internal electrode 121 may be connected to the third, fifth, and sixth surfaces 3, 5, and 6 of the body 110, and the second internal electrode 122 may be connected to the fourth, fifth, and sixth surfaces 4, 5, and 6 of the body 110. In this case, at least a portion of both ends of the first internal electrode 121 in the third direction and at least a portion of both ends of the second internal electrode 122 in the third direction may include an Si secondary phase SP.

In a method in which the side margin portions are separately attached, since the first and second internal electrodes 121 and 122 are exposed on both end surfaces of the body 110 in the third direction, there may be generally concerns that at least a portion of both ends of the first internal electrode 121 in the third direction and at least a portion of both ends of the second internal electrode 122 in the third direction may be prone to generate defects such as pores or the like, and thus moisture resistance reliability may be deteriorated or insulation resistance may be deteriorated. According to an embodiment of the present disclosure, at least a portion of both ends of the first internal electrode 121 in the third direction and at least a portion of both ends of the second internal electrode 122 in the third direction may include an Si secondary phase SP to improve moisture resistance reliability and insulation resistance. In addition, according to an embodiment of the present disclosure, Sn and Si may be simultaneously included in the side margin portions 114 and 115, and as Sn, which has a low melting point and is easy to diffuse, diffuses, Si may also diffuse along with Sn. An Si secondary phase SP may be easily formed on at least a portion of both ends of the first internal electrode 121 in the third direction and at least a portion of both ends of the second internal electrode 122 in the third direction.

In this case, an average size of Si secondary phases SP included in each of the first and second internal electrodes 121 and 122 may be greater than an average size of Si secondary phases SP respectively included in the first region 114a and the second region 114b. Also, an average size of Si secondary phases SP included in the first region 114a may be greater than an average size of Si secondary phases SP included in the second region 114b.

In an embodiment, the body 110 may include a capacitance formation portion Ac including the first and second internal electrodes 121 and 122 alternately disposed in the first direction, with the dielectric layer 111 interposed therebetween. The dielectric layer 111 of the capacitance formation portion Ac may include Sn. In this case, Sn included in the dielectric layer 111 of the capacitance formation portion Ac may be included as an additive in a ceramic green sheet to form the dielectric layer or may be diffused in the side margin portions.

In addition, an average amount of Sn included in the dielectric layer 111 of the capacitance formation portion Ac may be smaller than an average amount of Sn included in the first region 114a. Therefore, a structure having a concentration gradient in which the Sn amount of the first region 114a gradually increases from the internal electrodes 121 and 122 to the second region 114b may be easily implemented.

The external electrodes 131 and 132 may be disposed on the third and fourth surfaces 3 and 4 of the body 110, respectively.

The external electrodes 131 and 132 may be disposed on the third and fourth surfaces 3 and 4 of the body 110, respectively, and may include first and second external electrodes 131 and 132 respectively connected to the first and second internal electrodes 121 and 122.

Referring to FIG. 1, the external electrodes 131 and 132 may be disposed to cover both end surfaces of the side margin portions 114 and 115 in the second direction, respectively.

In this embodiment, a structure in which the multilayer electronic component 100 has two external electrodes 131 and 132 is illustrated, but the number and shapes of the external electrodes 131 and 132 may depend on shapes of the internal electrodes 121 and 122, or may be changed for other purposes.

In an embodiment, the external electrodes 131 and 132 may include a first external electrode 131 disposed on the third surface of the body 110, and a second external electrode 131 disposed on the fourth surface of the body 110. The internal electrodes 121 and 122 may include a first internal electrode 121 contacting the first external electrode 131 and a second internal electrode 122 contacting the second external electrode 132. Both end portions of each of the first and second internal electrodes 121 and 122 in the third direction may be in contact with the side margin portions 114 and 115, respectively.

The external electrodes 131 and 132 may be formed using any material as long as they have electrical conductivity, such as metal, and a specific material may be determined in consideration of electrical characteristics, structural stability, and the like, and may further have a multilayer structure.

For example, the external electrodes 131 and 132 may include an electrode layer disposed on the body 110, and a plating layer formed on the electrode layer, respectively.

As a more specific example of the electrode layer, the electrode layer may be a sintered electrode including a conductive metal and glass, or a resin-based electrode including a conductive metal and a resin.

In addition, the electrode layer may have a form in which the sintered electrode and the resin-based electrode are sequentially formed on the body. In addition, the electrode layer may be formed by transferring a sheet containing a conductive metal onto the body or by transferring a sheet containing a conductive metal onto the sintered electrode.

A material having excellent electrical conductivity may be used as the conductive metal included in the electrode layer, and is not particularly limited. For example, the conductive metal may be at least one of nickel (Ni), copper (Cu), or an alloy thereof.

The plating layer serves to improve mounting characteristics. A type of the plating layer is not particularly limited, and may be a plating layer containing at least one of Ni, Sn, Pd, or nd an alloy thereof, and may be formed as a plurality of layers.

For a more specific example of the plating layer, the plating layer may be an Ni plating layer or an Sn plating layer, and may have a form in which the Ni plating layer and the Sn plating layer are sequentially formed on the electrode layer, and may have a form in which the Sn plating layer, the Ni plating layer, and the Sn plating layer are sequentially formed. In addition, the plating layer may include a plurality of Ni plating layers and/or a plurality of Sn plating layers.

A size of the multilayer electronic component 100 does not need to be particularly limited.

To achieve miniaturization and high capacitance at the same time, a thickness of the dielectric layer and a thickness of each of the internal electrodes should increase to increase the number of layers. Therefore, in a multilayer electronic component 100 having a size of 1005 (length×width, 1.0 mm×0.5 mm) or less, an effect of improving reliability according to the present disclosure may be more remarkable.

Therefore, when a length of the multilayer electronic component 100 is 1.1 mm or less and a width thereof is 0.55 mm or less, considering a manufacturing error, an external electrode size, or the like, an effect of improving reliability according to the present disclosure may be more remarkable. In this case, the length of the multilayer electronic component 100 may mean a maximum size of the multilayer electronic component 100 in the second direction, and the width of the multilayer electronic component 100 may mean a maximum size of the multilayer electronic component 100 in the third direction.

Hereinafter, the disclosure will be present described in more detail through experimental examples, but this may be to help a detailed understanding of the present disclosure, and the scope of the present disclosure is not limited by the experimental examples.

EXPERIMENTAL EXAMPLES

Conductive pastes for internal electrodes were applied on ceramic green sheets, stacked in the first direction, and cut into chip units to prepare a body, and then ceramic green sheets for side margin portions were stacked on both end surfaces of the body in the third direction, and sintered to form external electrodes, to prepare a sample chip.

In a comparative example, Sn was not added to the ceramic green sheets for side margin portions. In an inventive example, Sn was added to the ceramic green sheets for the side margin portions, and sintering conditions were controlled to occur Sn diffusion during a sintering process.

Moisture resistance reliability and occurrence of cracks of the comparative example and the inventive example were evaluated and listed in Table 1 below.

Moisture resistance reliability evaluation was conducted by continuously applying a total of three (3) step conditions to twenty (20) samples each of the comparative example and the inventive example. A second step was carried out for 1 hour under conditions of a temperature of 85° C., relative humidity of 0%, and a voltage of 7.56V, and a third step was performed for 2 hours under conditions of a temperature of 85° C., relative humidity of 60%, and a voltage of 4.41V. After going through the three (3) step process, the number of samples in which "IR Low" occurred and the number of samples in which "IR Fail" occurred were illustrated in Table 1 below. After going through the three (3) step process, when measured insulation resistance fell below 1/100 of the initial insulation resistance, it was determined if IR Low had occurred. After going through the three (3) step process, when measured insulation resistance fell $10^6 \Omega$ or lower, it was determined if IR Fail had occurred.

Occurrence of a crack was determined by polishing twenty (20) sample chips to a center in the second direction to expose cross-sections in the first and third directions, and then visually observing whether or not cracks occurred in the side margin portions using an optical microscope. The number of samples having a crack has been described.

TABLE 1

| Example | IR Low | IR Fail | Occurrence of Crack |
|---|---|---|---|
| Comparative | 4/20 | 2/20 | 5/20 |
| Inventive | 0/20 | 0/20 | 0/20 |

Referring to Table 1, in the comparative example, cracks occurred in fire (5) samples, IR Low occurred in four (4) samples, and IR Fail occurred in two (2) samples with an insulation resistance of $10^6 \Omega$ or less.

In the inventive example, there were no samples with cracks, and there were no samples with IR Low and IR Fail. Therefore, it was confirmed that reliability was remarkably excellent.

Figure 6:
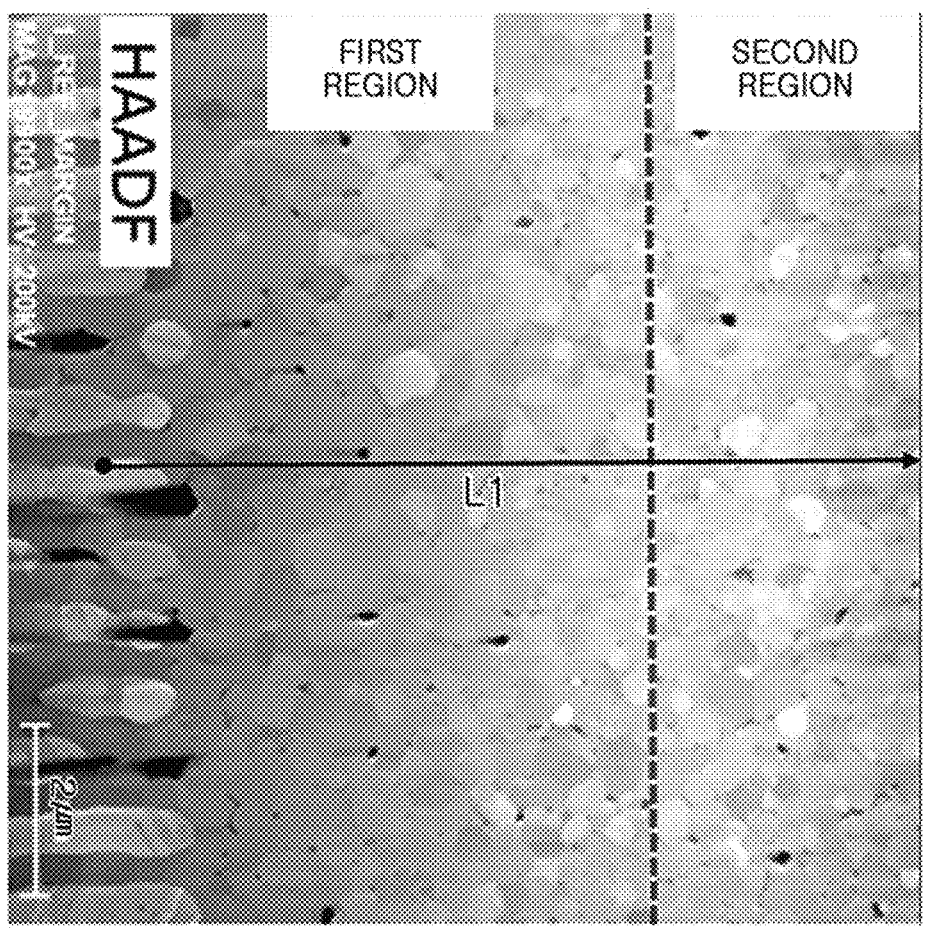
FIG. 6 is an image obtained by scanning cross-sections in first and third directions of a side margin portion of an embodiment of the present disclosure with a scanning transmission electron microscope (STEM).
Figure 7:
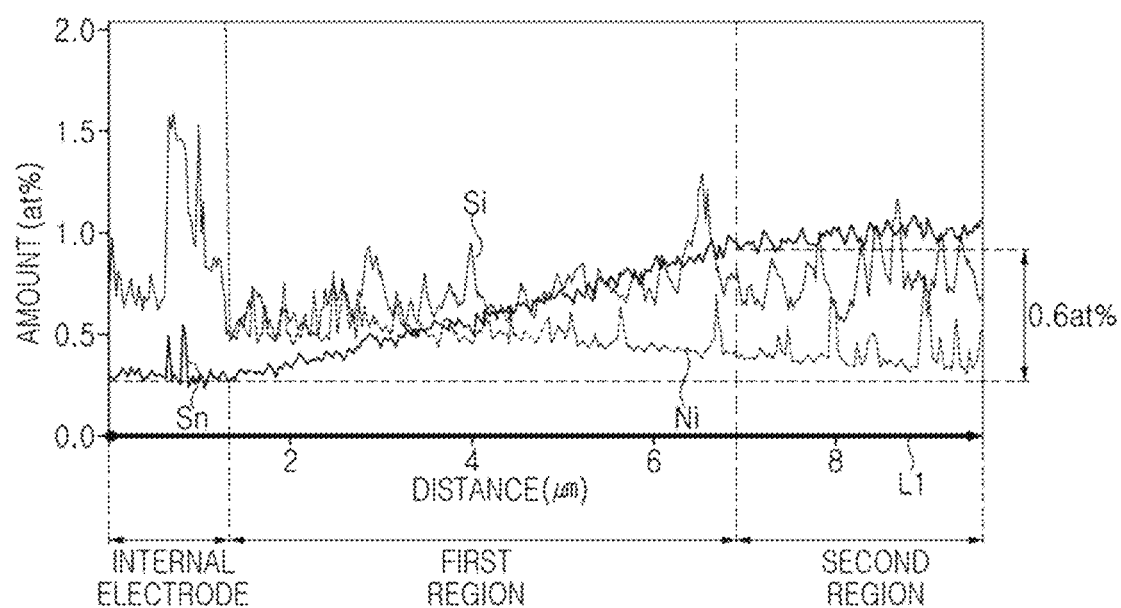
FIG. 7 is a result of line profiling along line L1 of FIG. 6.

FIG. 6 is an image obtained by scanning cross-sections in first and third directions of a side margin portion of an embodiment of the present disclosure with a scanning transmission electron microscope (STEM). FIG. 7 is a result of line profiling along line L1 of FIG. 6.

Referring to FIGS. 6 and 7, it can be seen that an Sn amount of a first region was lower than an Sn amount of a second region, and the Sn amount of the first region gradually increased from internal electrodes to the second region. In the second region, the Sn amount hardly increased and was substantially constant.

In FIG. 7, a size of a first region in the third direction was 5.5 μm, and a difference between an Sn amount in a portion of the first region contacting the body and an Sn amount in a portion of the first region contacting a second region was 6.0 at %. It can be seen that the Sn amount of the first region increased by 0.1 at % or more per 1 μm in a direction from internal electrodes to the second region.

Figure 8:
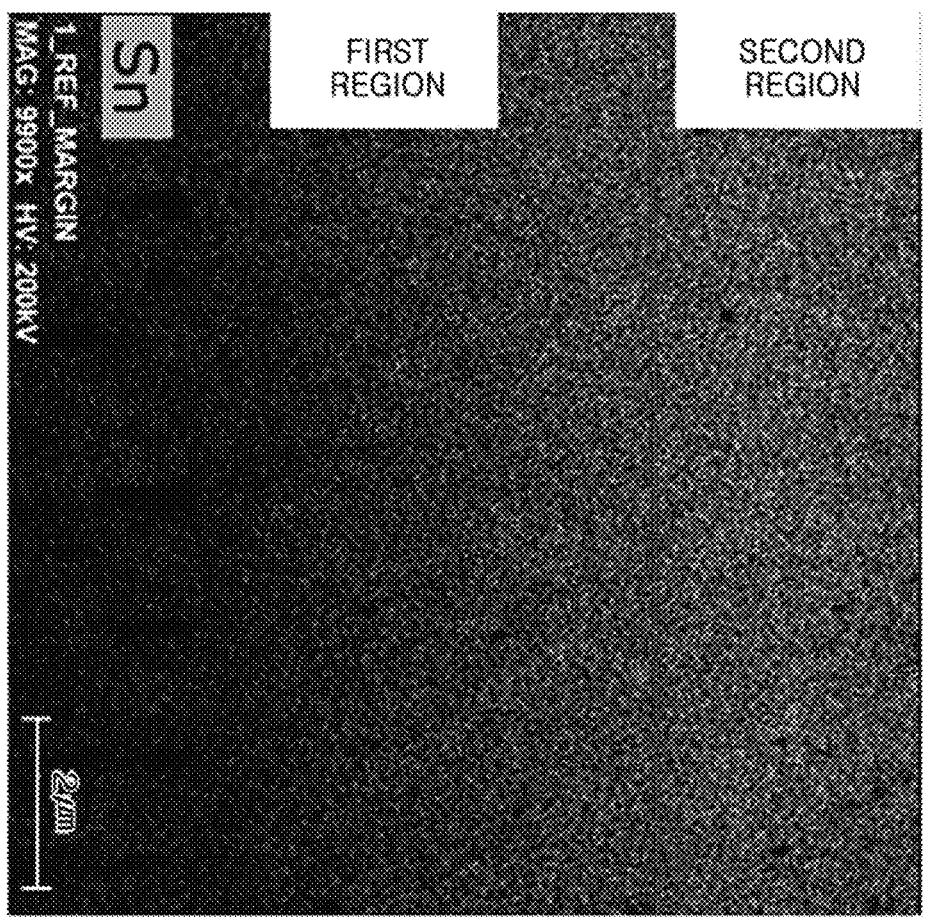
FIG. 8 is a result of mapping Sn elements in the region of FIG. 6 by STEM-EDS.

In addition, referring to FIG. 8, which is a result of mapping Sn elements in the region of FIG. 6 by STEM-EDS, it can be seen that an Sn amount was changed throughout the first and second regions as the results of the line profile. You may check.

Figure 9:
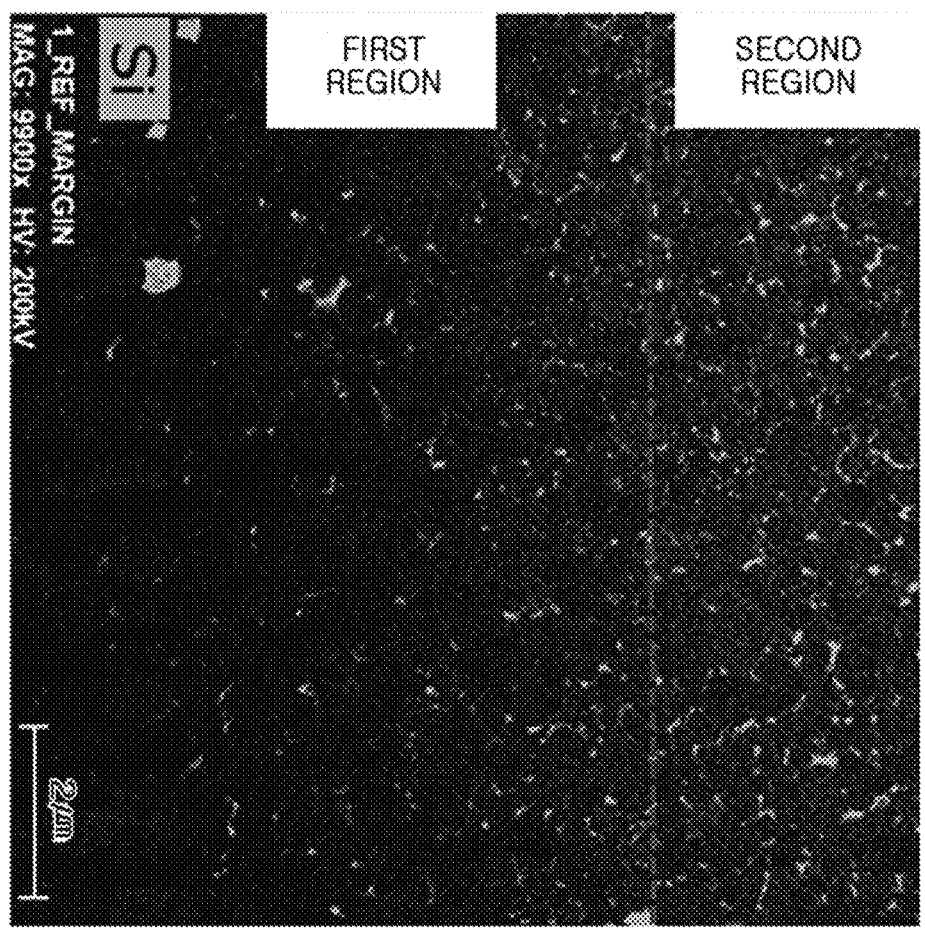
FIG. 9 is a result of mapping Si elements in the region of FIG. 6 by STEM-EDS.

Referring to FIG. 6 and FIG. 9, which is a result of mapping Si elements in the region of FIG. 6 by STEM-EDS, it can be seen that the Si amount was high in the second region, and was low in the first region. In Si, it can be observed as being aggregated in some regions, and it can be seen as Si precipitating and forming a secondary phase during a sintering process. In addition, it can be confirmed that a large Si secondary phase was precipitated on end portions of internal electrodes.

Figure 10:
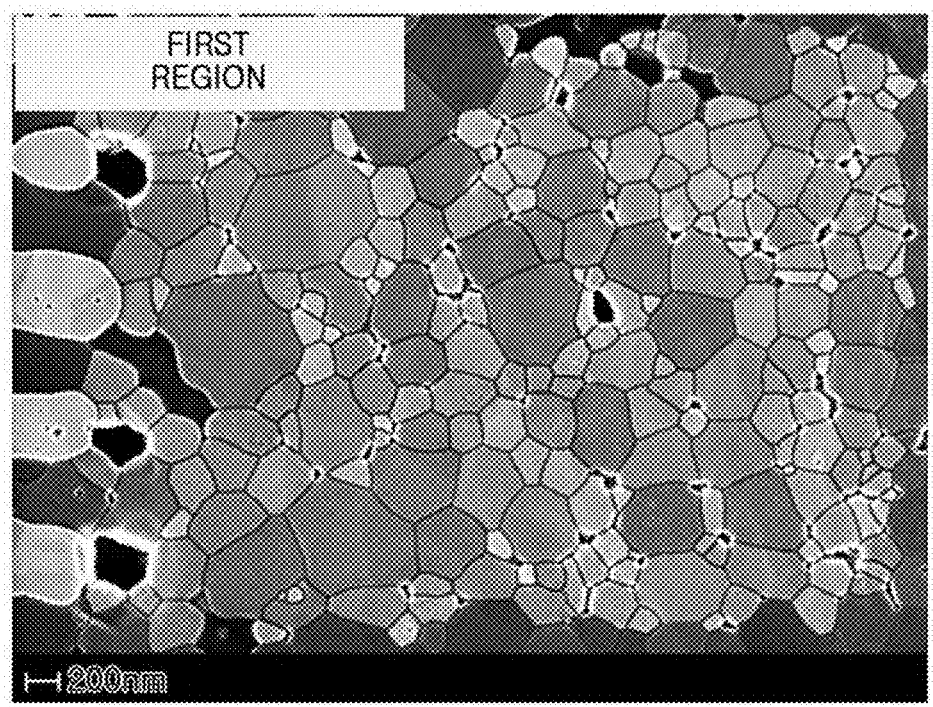
FIG. 10 is an image obtained by scanning a first region with a scanning transmission electron microscope (STEM) at a magnification of 50,000.

To confirm a size difference of crystal grains according to the Sn amount, the first region and the second region were further enlarged and observed. FIG. 10 is an image obtained by scanning a first region with a scanning transmission electron microscope (STEM) at a magnification of 50,000, and FIG. 11 is an image obtained by scanning a second region with a scanning transmission electron microscope (STEM) at a magnification of 50,000.

Figure 11:
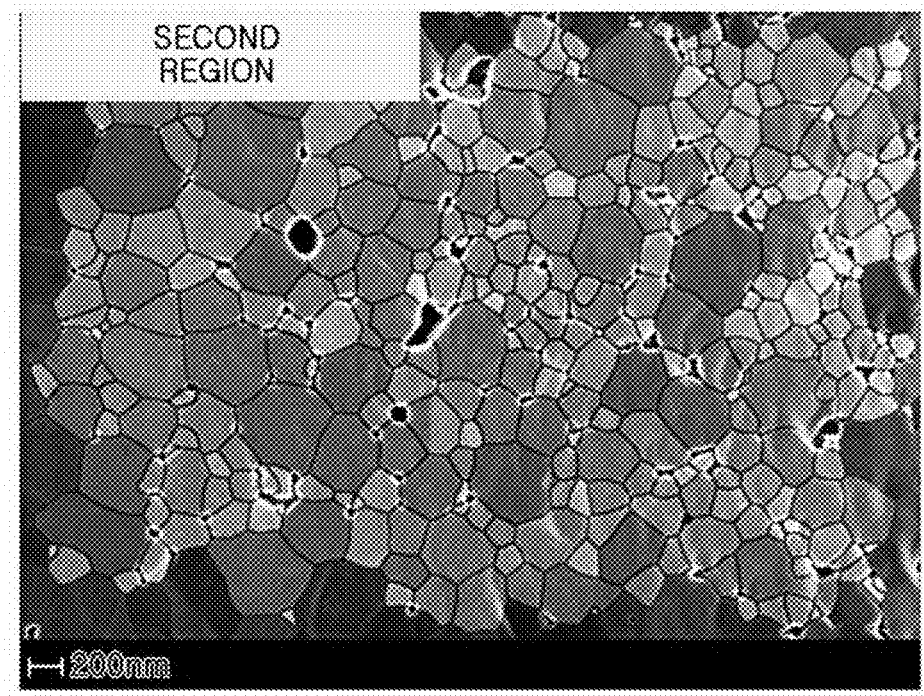
FIG. 11 is an image obtained by scanning a second region with a scanning transmission electron microscope (STEM) at a magnification of 50,000.

Referring to FIGS. 10 and 11, it can be seen that a grain size in a first region was larger than a grain size in a second region. In particular, it can be seen that large crystal grains were disposed in the first region adjacent to the body.

One of various effects of the present disclosure is to control an Sn amount for each position of a side margin portion to improve reliability of a multilayer electronic component.

One of various effects of the present disclosure is to control an Sn amount for each position of a side margin portion to suppress occurrence of cracks and propagation of cracks in the side margin portion.

One of various effects of the present disclosure is to suppress occurrence of cracks and propagation of cracks in a side margin portion to improve moisture resistance reliability of a multilayer electronic component.

Various advantages and effects of the present disclosure are not limited to the above description, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
   a body including a dielectric layer and first and second internal electrodes alternately disposed in a first direction with the dielectric layer interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
   side margin portions disposed on the fifth and sixth surfaces; and
   external electrodes disposed on the third and fourth surfaces,
   wherein each of the side margin portions includes a first region adjacent to the first and second internal electrodes, and a second region adjacent to an outside of each of the side margin portions,
   wherein an average Sn amount of the first region is lower than an average Sn amount of the second region,
   an Sn amount of the first region gradually increases from a side of the first and second internal electrodes to the second region, and
   a gradient, in the third direction, of the Sn amount in the first region is greater than a gradient, in the third direction, of the Sn amount in the second region.

2. The multilayer electronic component of claim 1, satisfying 3≤Cs2/Cs1≤5, where Cs1 is the average Sn amount of the first region, and Cs2 is the average Sn amount of the second region.

3. The multilayer electronic component of claim 1, wherein the average Sn amount of the first region is 0.25 at % or more and 0.7 at % or less and the average Sn amount of the second region is 0.75 at % or more and 4.0 at % or less.

4. The multilayer electronic component of claim 1, wherein a size of the first region in the third direction is 4 μm or more and 10 μm or less.

5. The multilayer electronic component of claim 1, wherein the Sn amount of the first region increases by 0.1 at % or more per 1 μm, in a direction from the side of the first and second internal electrodes to the second region.

6. The multilayer electronic component of claim 1, wherein a difference between an Sn amount of a portion of the first region contacting the body and an Sn amount of a portion of the first region contacting the second region is 0.5 at % or more.

7. The multilayer electronic component of claim 1, wherein an average size of the second region in the third direction is 6 μm or more and 15 μm or less.

8. The multilayer electronic component of claim 1, wherein an Sn amount of the second region increases by less than 0.1 at % per 1 μm, in a direction from the first region to the outside of each of the side margin portions.

9. The multilayer electronic component of claim 1, wherein a difference between an Sn amount of a portion of the second region contacting the first region and an Sn amount of a portion of the second region contacting the outside of each of the side margin portions is 0.3 at % or less.

10. The multilayer electronic component of claim 1, wherein an average crystal grain size of the first region is larger than an average crystal grain size of the second region.

11. The multilayer electronic component of claim 10, wherein the average crystal grain size of the first region is larger than the average crystal grain size of the second region by 50 nm or more.

12. The multilayer electronic component of claim 1, wherein an average crystal grain size of the first region is 200 nm or more and 400 nm or less, and
an average crystal grain size of the second region is 150 nm or more and 300 nm or less.

13. The multilayer electronic component of claim 1, wherein the first and second regions include Si, and
an average Si amount of the first region is lower than an average Si amount of the second region.

14. The multilayer electronic component of claim 1, wherein the first internal electrode is connected to the third, fifth, and sixth surfaces, and
the second internal electrode is connected to the fourth, fifth, and sixth surfaces.

15. The multilayer electronic component of claim 1, wherein at least a portion of both ends of the first internal electrode in the third direction and at least a portion of both ends of the second internal electrode in the third direction include an Si secondary phase.

16. The multilayer electronic component of claim 1, wherein the first and second regions include an Si secondary phase, and
an area ratio of the Si secondary phase disposed in the first region is lower than an area ratio of the Si secondary phase disposed in the second region.

17. The multilayer electronic component of claim 1, wherein the body comprises a capacitance formation portion including the first and second internal electrodes alternately disposed in the first direction with the dielectric layer interposed therebetween, and
wherein the dielectric layer of the capacitance formation portion includes Sn.

18. A multilayer electronic component comprising:
a body including a dielectric layer and first and second internal electrodes alternately disposed in a first direction with the dielectric layer interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
side margin portions disposed on the fifth and sixth surfaces; and
external electrodes disposed on the third and fourth surfaces,
wherein each of the side margin portions includes a first region adjacent to the first and second internal electrodes, and a second region adjacent to an outside of each of the side margin portions,
wherein an average Sn amount of the first region is lower than an average Sn amount of the second region,
an Sn amount of the first region gradually increases from a side of the first and second internal electrodes to the second region, and
3≤Cs2/Cs1≤5 is satisfied, where Cs1 is the average Sn amount of the first region, and Cs2 is the average Sn amount of the second region.

19. The multilayer electronic component of claim 18, wherein the body comprises a capacitance formation portion including the first and second internal electrodes alternately disposed in the first direction with the dielectric layer interposed therebetween, and
wherein the dielectric layer of the capacitance formation portion includes Sn.

20. A multilayer electronic component comprising:
a body including a dielectric layer and first and second internal electrodes alternately disposed in a first direction with the dielectric layer interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
side margin portions disposed on the fifth and sixth surfaces; and
external electrodes disposed on the third and fourth surfaces,
wherein each of the side margin portions includes a first region adjacent to the first and second internal electrodes, and a second region adjacent to an outside of each of the side margin portions,
wherein an average Sn amount of the first region is lower than an average Sn amount of the second region,
an Sn amount of the first region gradually increases from a side of the first and second internal electrodes to the second region, and
a difference between an Sn amount of a portion of the first region contacting the body and an Sn amount of a portion of the first region contacting the second region is 0.5 at % or more.

* * * * *